(12) United States Patent
Kahmann

(10) Patent No.: US 6,705,628 B2
(45) Date of Patent: Mar. 16, 2004

(54) COMPACT FOLDING TRAILER

(76) Inventor: Paul Kahmann, 81 Normon Ridge Dr., Bloomington, MN (US) 55437

(*) Notice: Subject to any disclaimer, the term of this patent is extended or adjusted under 35 U.S.C. 154(b) by 155 days.

(21) Appl. No.: 09/974,487

(22) Filed: Oct. 9, 2001

(65) Prior Publication Data

US 2003/0067138 A1 Apr. 10, 2003

(51) Int. Cl.⁷ .............................................. B62K 27/00
(52) U.S. Cl. ....................................................... 280/204
(58) Field of Search .................................. 280/642, 644, 280/648, 650, 656–658, 79.2, 47.38, 204, 401, 278, 287

(56) References Cited

U.S. PATENT DOCUMENTS

| | | |
|---|---|---|
| 699,186 A | 5/1902 | Katzke |
| 716,972 A | 12/1902 | Whitmore et al. |
| 2,781,225 A | 2/1957 | Heideman |
| 3,848,890 A | 11/1974 | MacAlpine |
| 3,873,116 A | 3/1975 | Perego |
| 3,877,723 A | 4/1975 | Fahey et al. |
| 4,072,318 A | 2/1978 | Laune |
| 4,335,900 A | 6/1982 | Fleischer |
| 4,548,423 A | 10/1985 | Craven |
| 4,586,721 A | 5/1986 | Harada et al. |
| 4,606,550 A | 8/1986 | Cone |
| 4,756,541 A | 7/1988 | Albitre |
| D297,525 S | 9/1988 | Baechler |
| 4,934,728 A | 6/1990 | Chen |
| 4,953,880 A | 9/1990 | Sudakoff et al. |
| D315,885 S | 4/1991 | Jacobs |
| 5,020,814 A * | 6/1991 | George et al. ............... 280/204 |
| 5,029,891 A | 7/1991 | Jacobs |
| 5,076,599 A | 12/1991 | Lockett et al. |
| 5,176,395 A | 1/1993 | Garforth-Bles |
| 5,224,720 A | 7/1993 | Chaw et al. |
| 5,242,178 A | 9/1993 | Galasso et al. |
| 5,259,634 A | 11/1993 | Berner et al. |
| 5,265,891 A | 11/1993 | Diehl |
| 5,301,963 A | 4/1994 | Chen |
| 5,308,096 A | 5/1994 | Smith |
| 5,318,318 A * | 6/1994 | Berner et al. ................ 280/204 |
| 5,344,171 A * | 9/1994 | Garforth-Bles .......... 280/415.1 |
| 5,356,171 A | 10/1994 | Schmidlin et al. |
| D356,761 S | 3/1995 | Jacobs et al. |
| 5,421,597 A | 6/1995 | Berner |
| 5,460,395 A | 10/1995 | Chen |
| 5,522,614 A | 6/1996 | Eyman et al. |
| 5,577,746 A * | 11/1996 | Britton ........................ 280/204 |
| 5,599,033 A * | 2/1997 | Kolbus et al. ............... 280/204 |
| 5,687,980 A * | 11/1997 | Eckroth ....................... 280/204 |
| 5,785,333 A * | 7/1998 | Hinkston et al. ........... 280/204 |
| 5,921,571 A * | 7/1999 | Bell ............................. 280/204 |
| 5,979,921 A * | 11/1999 | Derven et al. .............. 280/204 |
| 6,017,051 A * | 1/2000 | Thimmig ..................... 280/642 |
| 6,056,306 A * | 5/2000 | Rust et al. ................... 280/204 |

FOREIGN PATENT DOCUMENTS

DE            213538        4/1908

* cited by examiner

Primary Examiner—Lesley D. Morris
Assistant Examiner—Paul Royal, Jr.
(74) Attorney, Agent, or Firm—Gerald E. Helget; Nelson R. Capes; Briggs and Morgan

(57) ABSTRACT

A conveniently transportable, foldable infant stroller for safely and smoothly carrying an infant at walking speed and at a relatively higher speed than the normal walking speed of approximately 3–4 miles per hour, and convertible to a trailer for safely and smoothly carrying an infant pulled behind a bicycle. The stroller has a collapsible child enclosure that folds onto the seat portion. A folding trailer hitch assembly is pivotally attached to the frame of the stroller. A front wheel is removable from the stroller to convert the stroller to a trailer. The rear wheels are removable for storage.

12 Claims, 4 Drawing Sheets

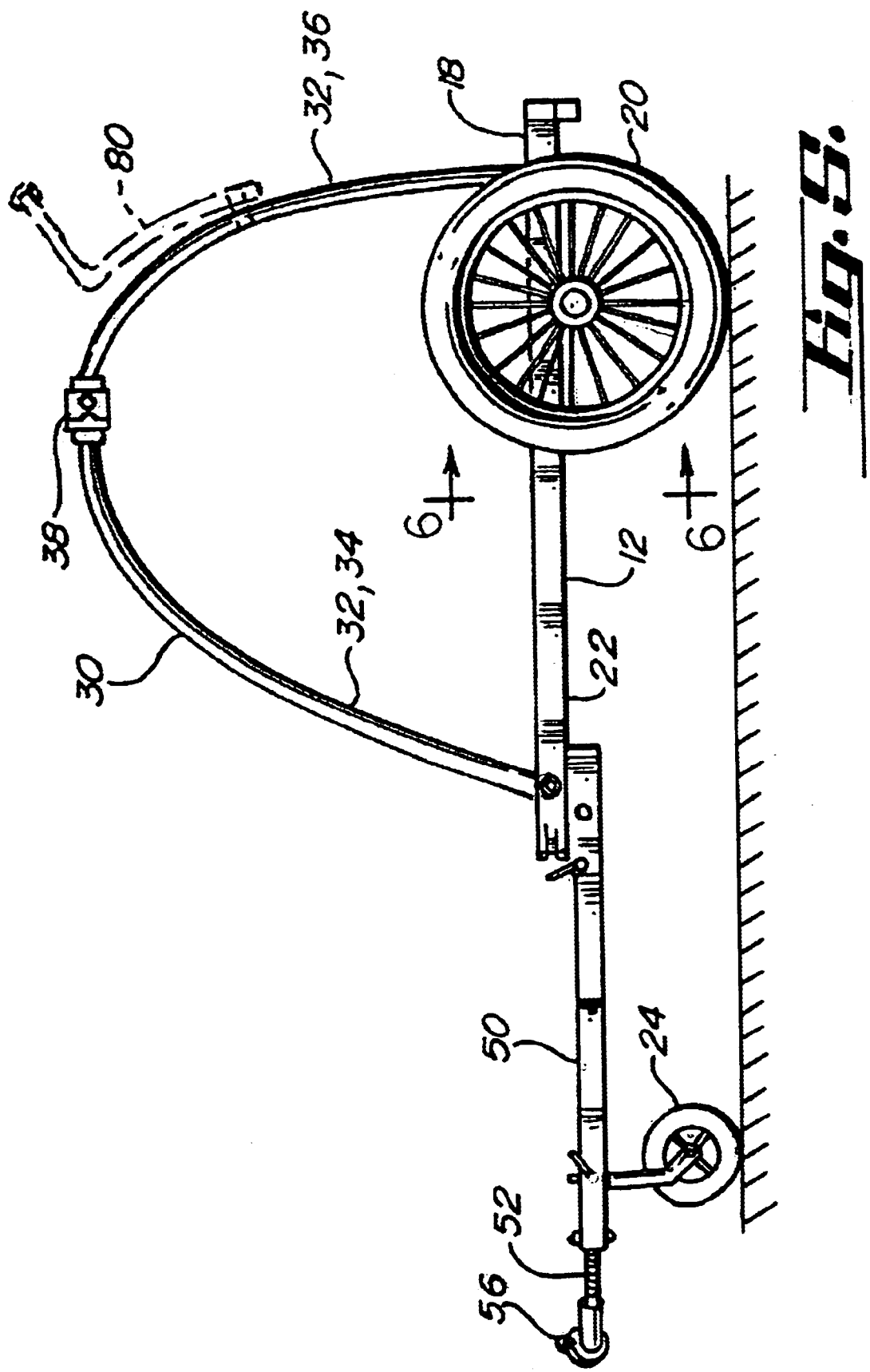

COMPACT FOLDING TRAILER

BACKGROUND OF THE INVENTION

This invention relates generally to wheeled infant carriers, and more particularly, to a conveniently transportable, foldable infant trailer for safely and smoothly carrying the infant pulled behind a cycle, such as a bicycle, which is also uniquely convertible to an infant stroller. More particularly, the infant trailer is foldable into a very compact configuration for placement in the trunk of a vehicle.

Collapsible or foldable baby carriages for walking have long been known and are generally described in U.S. Pat. Nos. 2,781,225; 3,873,116; and 4,072,318. These early carriages have evolved from more cumbersome rigid carriages, so many carriages are now collapsible or foldable as to make them conveniently transported and stored.

With the resurgence of physical fitness, persons of all ages, including the parents of infants and young children, have developed great interest in all forms of physical exercise, particularly in jogging and walking at relatively high speeds. Infant jogging strollers that fold for transport and/or storage, while yet provide for safe, stable and secure carrying of a child at relatively higher speeds, are generally shown in U.S. Pat. Nos. Des. 297,525; 4,934,728; 4,953,880; Des. 315,885; and 5,029,891.

U.S. Pat. No. 5,259,634 discloses a convertible infant stroller and trailer that is foldable and convertible to a trailer for attachment to a bicycle.

U.S. patent Ser. No. 09/799,293 discloses a towing bracket for attaching a trailer to a bicycle.

There is a continued need for a foldable infant trailer which includes all the past known refinements, but further includes the ability to fold the trailer very compactly for storage in the trunk of a vehicle.

SUMMARY OF THE INVENTION

A conveniently transportable, foldable infant trailer for safely and smoothly carrying an infant pulled behind a bicycle. The trailer has a collapsible child enclosure that folds onto the seat portion. A folding trailer hitch assembly is pivotally attached to the frame of the trailer. A front wheel is attachable to the trailer to convert the trailer to a stroller. The rear wheels are removable for storage.

A principle object and advantage of the present invention is that it is convertible from trailer to a stroller.

Another principle object and advantage of the present invention is that the trailer has a collapsible child enclosure that folds onto the seat portion of the trailer for compact storage.

Another principle object and advantage of the present invention is that the front wheel and rear wheels of the trailer are removable.

Another principle object and advantage of the present invention is that the cycle hitch assembly is foldable under the trailer for storage.

BRIEF DESCRIPTION OF THE DRAWINGS

FIG. 5 is a side elevational view of the foldable infant trailer of the present invention with some structure removed.

DETAILED DESCRIPTION OF THE PREFERRED EMBODIMENT

Figure 1:
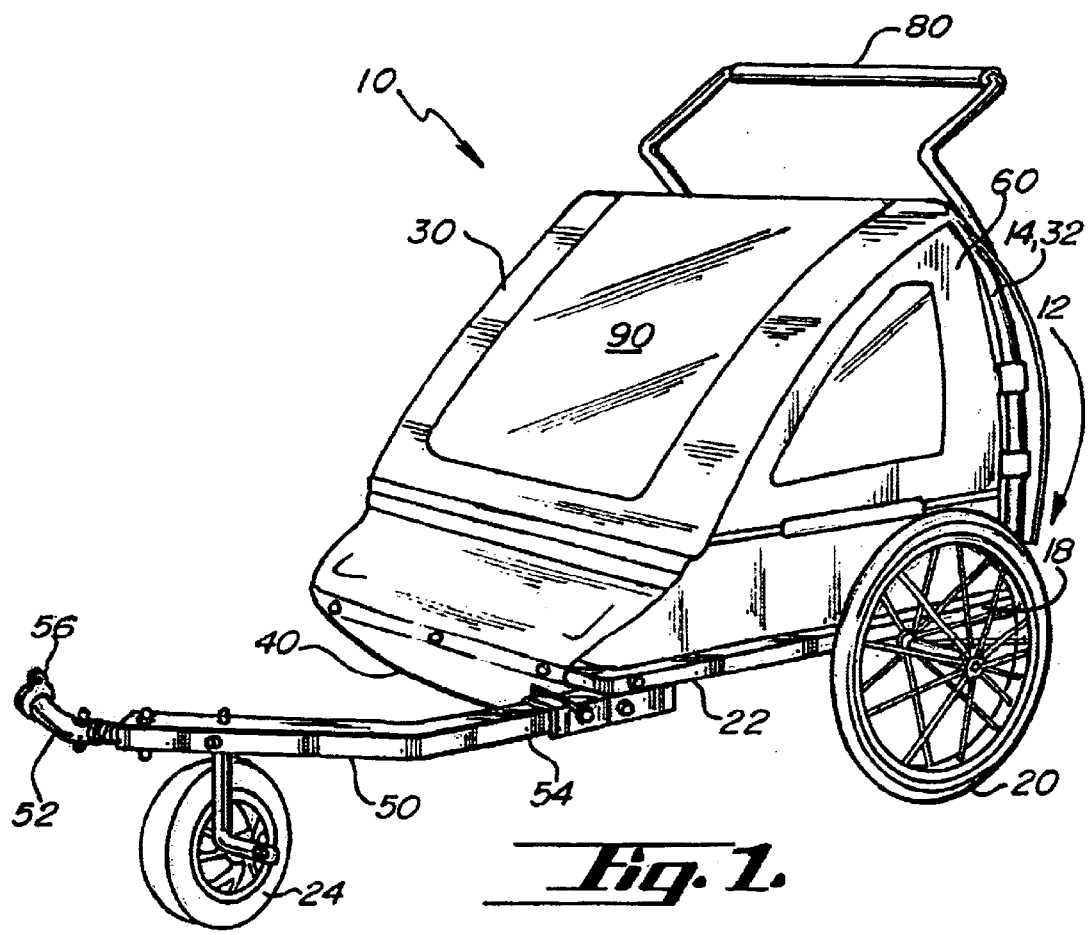
FIG. 1 is a perspective view of the foldable infant trailer of the present invention.

The transportable, foldable infant trailer of the present invention is generally shown in the Figures as reference numeral 10.

The transportable, foldable infant trailer 10 comprises a base 12 having an upper frame portion 14. The base 12 has a rear end 18 supporting two rear wheels 20 and a front end 22 releasably supporting a front wheel 24. Upon attachment of the front wheel 24, the trailer 10 converts into a trailer.

The upper frame portion 14 further comprises a collapsible child enclosure 30. The base 12 further comprises a seat portion 40. The collapsible child enclosure 30 is lowerable onto the seat portion 40 into a folded condition.

The transportable, foldable trailer 10 further comprises a trailer cycle hitch assembly 50 having a cycle attachment end 52 and a trailer end 54, the trailer end 54 being attached to the front end 22 of the base 12, and the cycle attachment end 52 further comprising a towing bracket 56 for attachment to a bicycle.

Preferably the trailer hitch assembly 50 is foldable, and the trailer end 54 is pivotally attached to the front end 22 of the base 12.

Preferably, the collapsible child support 30 further comprises a pair of collapsible side supports 32 pivotally attached to the base 12. Most preferably, the collapsible side supports 32 each further comprise two segments 34, 36 and a connector 38 releasably connecting the two segments 34, 36. One of the segments 34 is preferably pivotally connected to the rear end 18 of the base 12 and the other segment 36 is preferably pivotally connected to the front end 22 of the base 12.

The foldable infant trailer 10 may also further comprise a flexible side panel 60 mounted to each of the pair of collapsible side supports 32; a cross bar 62 engaging the two collapsible side supports 32; and a flexible rear panel portion 70 mounted to the cross bar 62.

The foldable infant trailer 10 may also comprise a handle 80 releasably attachable to the upper frame portion 14.

The foldable infant trailer 10 may also comprise a flexible canopy 90 releasably attachable to the upper frame portion 14.

Figure 6:
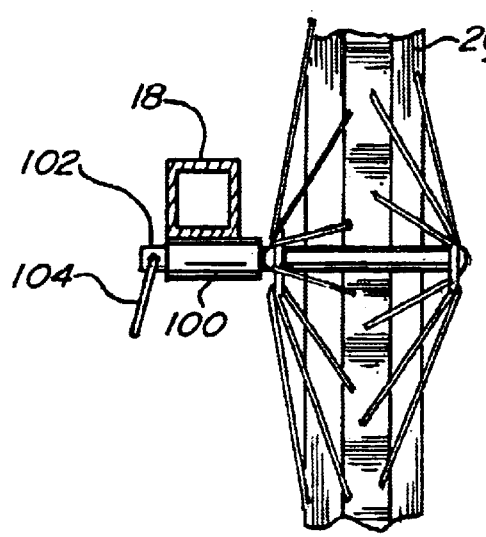
FIG. 6 is a cross-section taken approximately at the lines 6 of FIG. 5.

Preferably, the rear wheels 20 are detachable from the base 12. Although any method of releasable attachment may be used, as seen in FIG. 6 preferably the rear end 18 has a collar 100 and each wheel 20 has an axle extension 102 slidably engaging the collar 100. A pin 104 secures the axle extension 102 within the collar 100.

Figure 4:
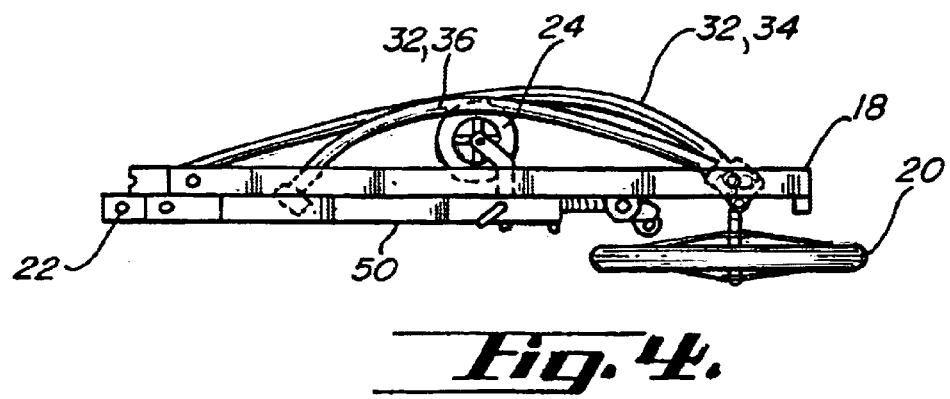
FIG. 4 is a top plan view of the foldable infant trailer of the present invention with some structure removed to show the collapsible child enclosure and the trailer hitch assembly in a folded condition.
Figure 1A:
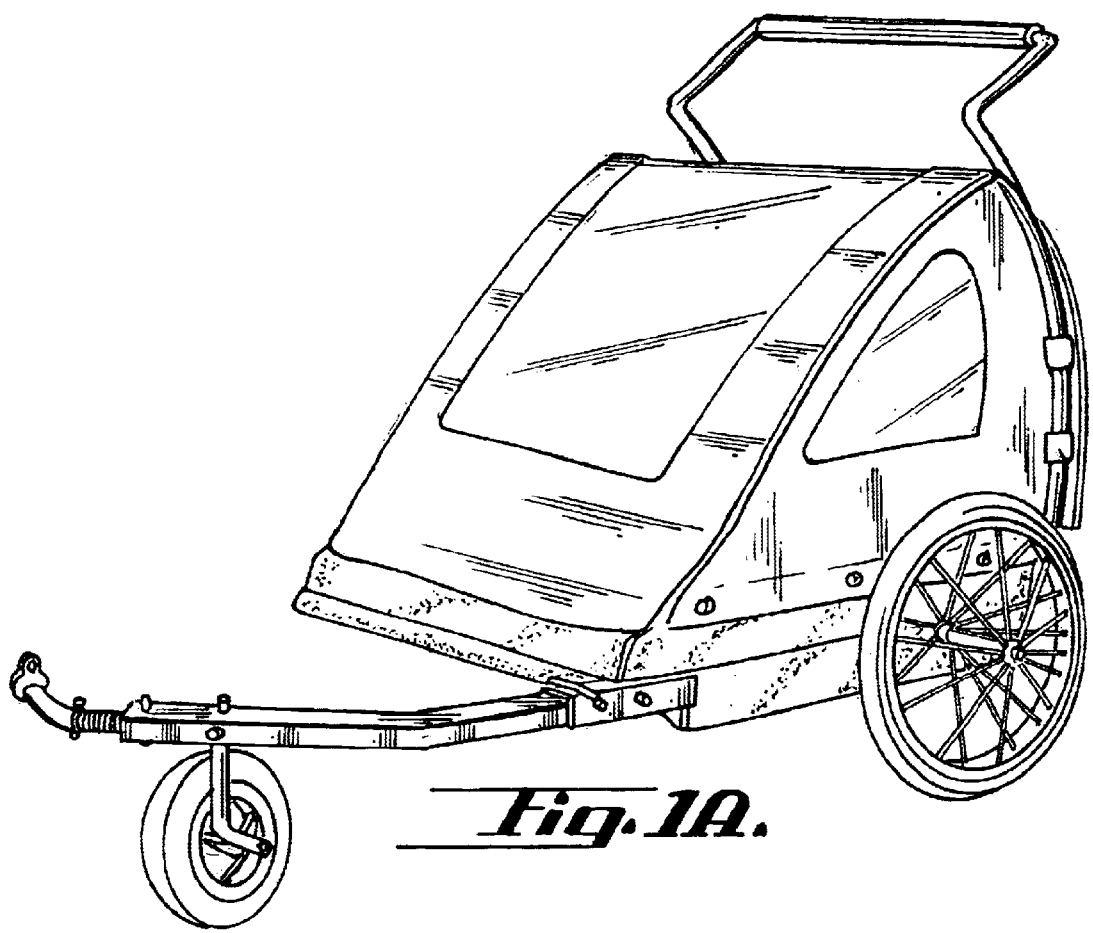
FIG. 1A is similar to FIG. 1.
Figure 3:
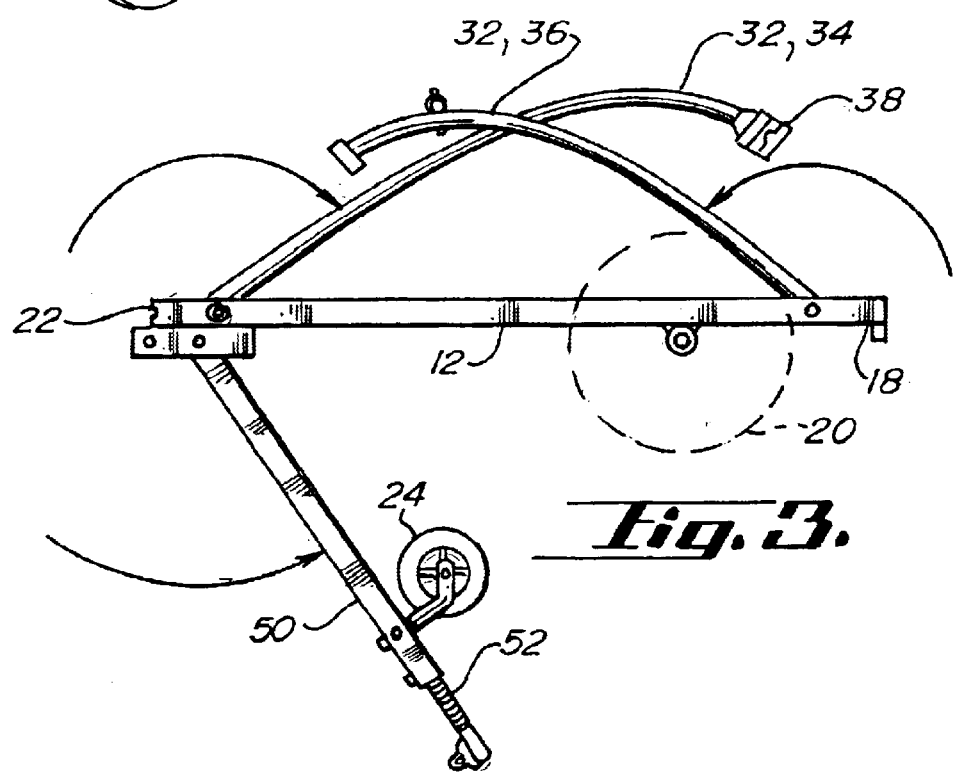
FIG. 3 is a side elevational view of the foldable infant trailer of the present invention with some structure removed to show the collapsible child enclosure and the trailer hitch assembly being folded.
Figure 2:
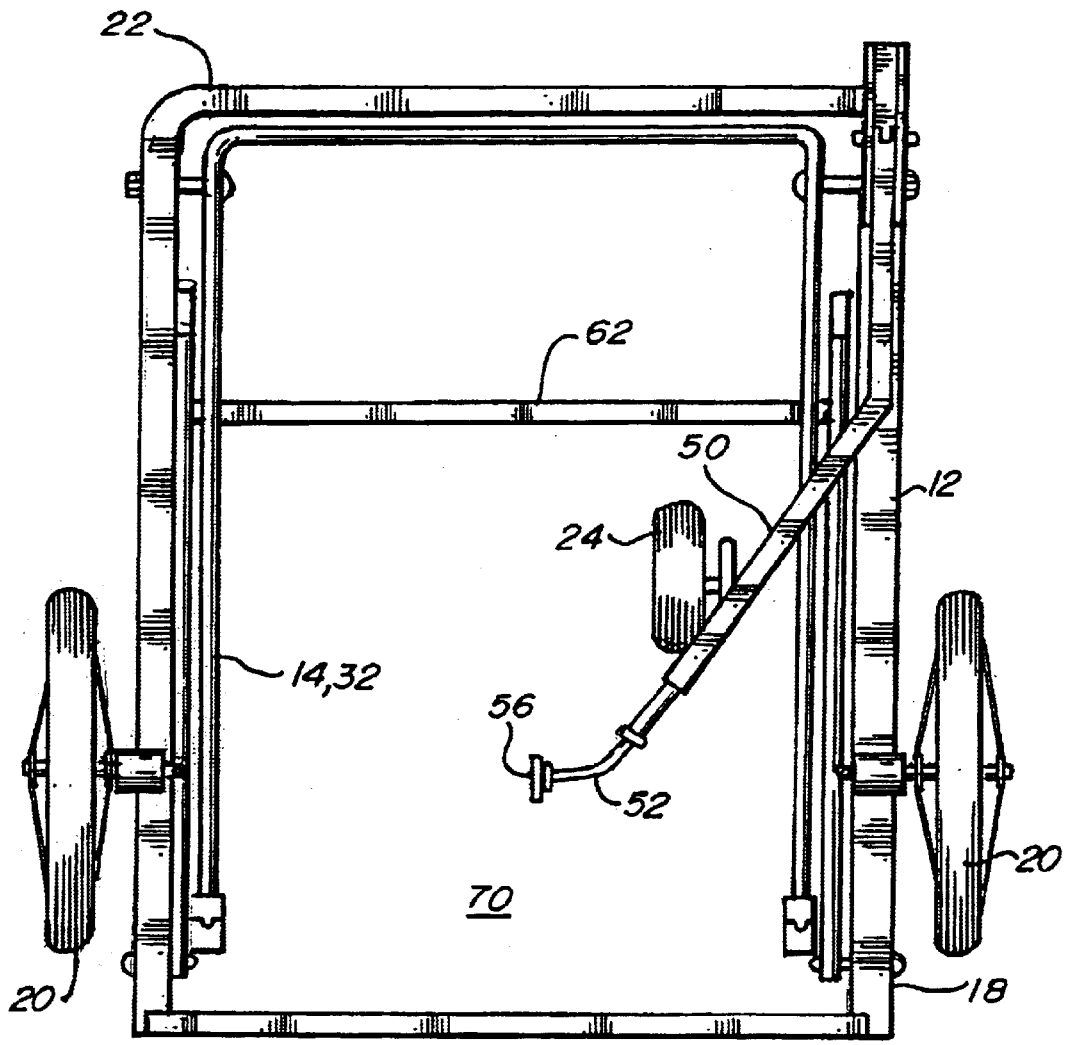
FIG. 2 is a bottom plan view of the foldable infant trailer of the present invention, with the seat portion removed.

To collapse the infant trailer 10 for storage, the connector 38 is released from each of the two collapsible side supports 32, freeing the segments 34, 36. Each segment 34, 36 is then pivoted on the base 12 and folded down upon the seat portion 40, as shown in FIGS. 3 and 4. The trailer hitch assembly 50 may then be pivoted on the base 12 and placed under the seat portion 40. The wheel 24 may then be removed from the cycle hitch assembly 50.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A conveniently transportable, foldable infant trailer for safely and smoothly carrying an infant pulled behind a cycle, the foldable convertible infant trailer comprising:
   a) a base having a rear end supporting two rear wheels and a front end and an upper frame portion mounted to the base and further comprising a collapsible child enclosure, the base further comprising a seat portion, the collapsible child enclosure being lowerable onto the base into a folded condition, wherein the child enclosure further comprises a pair of collapsible side supports pivotally attached to the base, wherein each of the pair of collapsible side supports further comprises two segments and a connector fully disconnecting the two segments; and
   b) a cycle hitch assembly having a cycle attachment end and a trailer end, the trailer end being attached to the front end of the base, and the cycle attachment end further comprising a towing bracket for attachment to a bicycle.

2. The foldable infant trailer of claim 1, further comprising a releasable front wheel attachable to the base to convert the trailer into a stroller.

3. The foldable infant stroller of claim 1, wherein one of the segments is pivotally connected to the rear end of the base and the other segment is pivotally connected to the front end.

4. The foldable infant stroller of claim 1, further comprising a flexible side panel mounted to each of the pair of collapsible side supports; a cross-bar engaging the two collapsible side supports; and a flexible rear panel mounted to the cross-bar.

5. The foldable infant stroller of claim 1, further comprising a handle releasably attachable to the upper frame portion.

6. The foldable infant stroller of claim 1, further comprising a flexible canopy releasably attachable to the upper frame portion.

7. The foldable infant stroller of claim 1, wherein the rear wheels are detachable from the base.

8. A conveniently transportable, foldable infant trailer for safely and smoothly carrying an infant pulled behind a cycle, the foldable convertible infant trailer comprising:
   a) a base having a rear end supporting two rear wheels and a front end and an upper frame portion mounted to the base and further comprising a collapsible child enclosure, the base further comprising a seat portion, the collapsible child enclosure being lowerable onto the base into a folded condition, wherein the child enclosure further comprises a pair of collapsible side supports pivotally attached to the base, wherein each of the pair of collapsible side supports further comprises two segments and a connector fully disconnecting the two segments;
   b) a releasable front wheel attachable to the base to convert the trailer into a stroller; and
   c) a cycle hitch assembly having a cycle attachment end and a trailer end, the trailer end being attached to the front end of the base, and the cycle attachment end further comprising a towing bracket for attachment to a bicycle.

9. The foldable infant stroller of claim 8, wherein one of the segments is pivotally connected to the rear end of the base and the other segment is pivotally connected to the front end.

10. The foldable infant stroller of claim 8, further comprising a flexible side panel mounted to each of the pair of collapsible side supports; a cross-bar engaging the two collapsible side supports; and a flexible rear panel mounted to the cross-bar.

11. The foldable infant stroller of claim 8, further comprising a handle releasably attachable to the upper frame portion.

12. The foldable infant stroller of claim 8, further comprising a flexible canopy releasably attachable to the upper frame portion.

* * * * *